US012766932B2

(12) United States Patent
Nuamah et al.

(10) Patent No.: US 12,766,932 B2
(45) Date of Patent: Oct. 20, 2026

(54) TRANSPARENT VEHICLE SUN VISOR APPARATUSES

(71) Applicant: ENIA LLC, Perrysburg, OH (US)

(72) Inventors: Isaac A. Nuamah, Perrysburg, OH (US); Stephen K. Armah, Perrysburg, OH (US)

(73) Assignee: ENIA LLC, Perrysburg, OH (US)

( * ) Notice: Subject to any disclaimer, the term of this patent is extended or adjusted under 35 U.S.C. 154(b) by 270 days.

(21) Appl. No.: 18/662,914

(22) Filed: May 13, 2024

(65) Prior Publication Data

US 2025/0346097 A1 Nov. 13, 2025

(51) Int. Cl.
*B60J 3/02* (2006.01)

(52) U.S. Cl.
CPC ............. *B60J 3/0217* (2013.01); *B60J 3/026* (2013.01); *B60J 3/0282* (2013.01)

(58) Field of Classification Search
CPC ........ B60J 3/0217; B60J 3/026; B60J 3/0282; B60J 3/0234; B60J 3/0252; B60J 3/0204
USPC ........................................................ 296/97.1
See application file for complete search history.

(56) References Cited

U.S. PATENT DOCUMENTS

| | | | | |
|---|---|---|---|---|
| 5,577,791 A * | 11/1996 | Viertel | B60J 3/0282 | 362/144 |
| 8,550,531 B1 * | 10/2013 | Fancher, III | B60J 3/0208 | 296/97.1 |
| 2005/0230997 A1 * | 10/2005 | Tiesler | B60J 3/0278 | 296/97.1 |
| 2017/0102489 A1 * | 4/2017 | Brown | G02B 5/22 | |
| 2021/0070231 A1 * | 3/2021 | Nomura | B60J 3/0282 | |
| 2023/0286358 A1 * | 9/2023 | Matsumoto | B60R 7/05 | |

* cited by examiner

*Primary Examiner* — Caroline N Butcher
(74) *Attorney, Agent, or Firm* — Chiacchio IP, LLC; Theodore J. Chiacchio

(57) ABSTRACT

Transparent vehicle sun visor apparatuses comprising a panel component, a top edge, a bottom edge, and at least one track; a stopper, wherein the stopper may be configured to attach to the panel component at the end of the at least one track; and a mirror assembly comprising an accessory slider, wherein the accessory slider comprises a wedge-shaped protrusion configured to slide onto the track.

8 Claims, 12 Drawing Sheets

TRANSPARENT VEHICLE SUN VISOR APPARATUSES

FIELD OF THE INVENTION

The present disclosure relates to vehicle sun visor apparatuses. More particularly, this disclosure relates to a substantially transparent sun visor apparatus comprising a sliding mirror assembly.

BACKGROUND

The sun can be dangerous to drivers particularly when it is close to the horizon, such as an hour before and after sunset. Traffic accident rates are higher when the sun is in front of the vehicle. Sunlight glare has been identified as a factor positively correlated with traffic accidents. Traffic accident rates at dusk and dawn are higher than traffic accident rates during other times of the day.

The primary conventional remedy relied upon to help address the problems identified above is by using sun visors to restrict the amount of sunlight glare in the driver's or passenger's line of sight. Conventional sun visors are made out of an opaque material, that block the sunlight glare but also block the user's field of view.

The substantially transparent sun visor apparatuses described herein solve the shortcomings of conventional opaque sun visors. The substantially transparent sun visor apparatuses described herein substantially block sunlight glare thereby providing visibility for the driver by not obstructing the driver's view.

SUMMARY

Described herein are substantially transparent sun visor apparatuses that block potentially dangerous sunlight glare from a vehicle driver's line of sight. Conventional sun visors are opaque and may be helpful in blocking sunlight glare that may otherwise adversely impact a vehicle driver's ability to see the road before him or her. However, such opaque sun visors also reduce the driver's field of view. This reduction in a driver's ability to see the road before him or her positively correlates with traffic accidents.

A panel component of sun visor apparatuses described herein may be made of any number of substantially transparent materials, including, without limitation, substantially transparent polycarbonate or substantially transparent Trivex. Polycarbonate or Trivex are both substantially transparent materials that solve visibility problems drivers face. Polycarbonate and Trivex are preferred materials for constructing the panel component because they offer strong protection against UV rays.

Conventional sun visors also commonly comprise an opaque mirror component. Sun visor apparatuses described herein comprise a substantially opaque mirror component. However, mirror components of sun visor apparatuses described herein may slide horizontally along a substantially horizontal sliding component to which the mirror component may be attached; the substantially horizontal slide component being attached to the panel component. Drivers, therefore, may slide the mirror apparatus in either direction horizontally to enhance their visibility on the road.

One embodiment of a vehicle sun visor apparatus as described herein comprises a panel component comprising a top edge and a bottom edge. The panel component may further comprise apertures at or near the top edge. The panel component may further comprise a rod assembly, which may include rod, a rod holder, and a rod bracket. In an embodiment, the rod may comprise at least one curved end. The rod holder may be configured to slide onto the rod such that, when so positioned, the rod holder may substantially encapsulate the rod. The rod holder comprising the rod may be configured to slide through the apertures and into the bracket.

The panel component may further comprise at least one track to which the mirror component may be attached.

Sun visor apparatuses as described herein may further comprise a stopper. The stopper may be configured to attach to the track at or near either end of the track.

Sun visor apparatuses described herein may further comprise a mirror assembly. The mirror assembly may comprise a mirror aspect, an accessory slider, a mirror holder, and a mirror cover. The mirror may be configured to attach to the mirror holder. The mirror holder may be configured to attach to the accessory slider.

The mirror cover may further comprise a spring notch assembly and a mirror cover notch. The spring notch assembly and the mirror cover notch may be configured to attach to the mirror holder.

The accessory slider may be configured to slide into the track.

The panel component may be comprised of a substantially transparent material. The substantially transparent material may also comprise a tinted material such as, without limitation, Trivex, polypropylene, Columbia resin #39, thermoplastic rubber, glass, poly(methyl methacrylate), high-index material and polycarbonate.

The mirror holder may further comprise one or more protrusions and the accessory slider may comprise one or more depressions. The one or more protrusions of the mirror holder and the one or more depressions of the accessory slider may be configured to connect with one another thereby adjoining the mirror holder and the accessory slider.

The mirror assembly may have a width between approximately 5 cm and 50 cm, as measured from the right edge to the left edge. The height of the mirror assembly may be between approximately 5 cm and approximately 25 cm, as measured from the top edge to the bottom edge.

The top edge of the visor panel may have a width between approximately 5 mm and 40 mm.

The width of the track may be between approximately 5 mm and 40 mm.

DETAILED DESCRIPTION

Figure 1A:
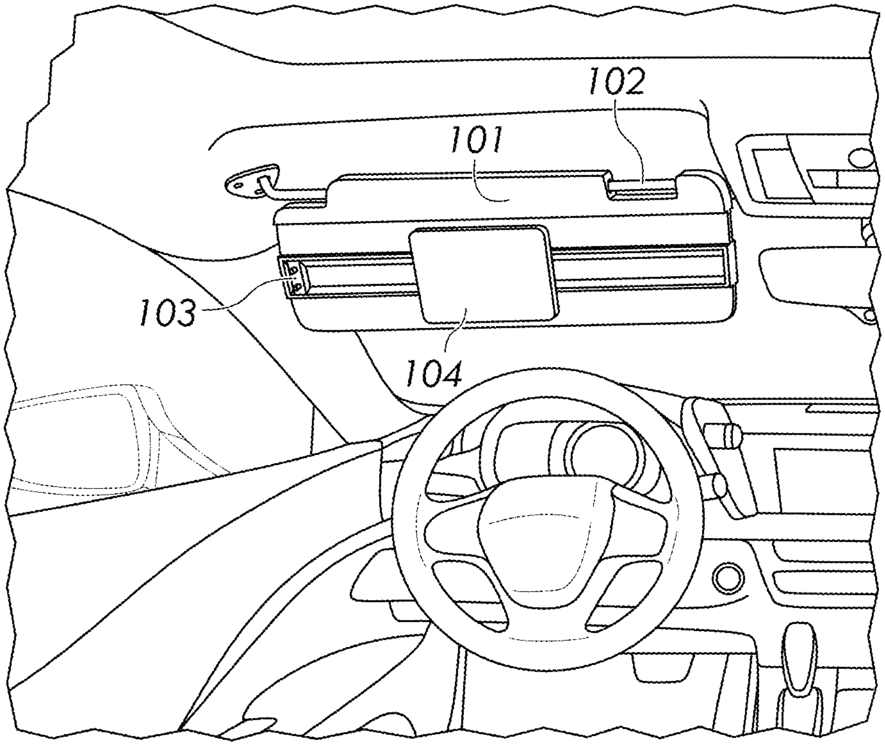
FIG. 1A is a perspective view of a substantially transparent sun visor component, according to an embodiment of this disclosure.

The following disclosure is provided to describe various embodiments of substantially transparent vehicle sun visor apparatuses. Skilled artisans will appreciate additional embodiments and uses of the present disclosure that extend beyond the examples of this disclosure.

Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more elements in that group, which may be included with other elements of the group. All numbers, measurements, and values are given as approximations unless expressly stated otherwise.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and ordinary meaning as would be understood by one of ordinary skill in the art. However, any definitions provided by the specification will govern above all other sources.

Various objects, features, aspects, and advantages described by this disclosure will become more apparent from the following detailed description, along with the accompanying drawings.

For the purpose of clearly describing the components and features discussed throughout this disclosure, some frequently used terms will now be defined, without limitation. The term "vehicle" as it is used throughout this disclosure shall mean passenger cars, trucks, mobile homes, buses, aircraft cockpits, ships, and trains. The term "substantially transparent" as it is used throughout this disclosure shall mean a degree of transparency equal to or greater than 95%. The term "substantially" as it is otherwise used throughout this disclosure (i.e., other than when used as part of the larger term "substantially transparent"), when used in connection with a particular value or state, shall mean within a range of 2.5% higher or lower than such value or state. The term "approximately" as it is used throughout this disclosure in connection with a particular value, shall mean within a range of 2.5% higher or lower than such value.

Various aspects of the disclosure will now be described in detail, without limitation. In the following disclosure, vehicle sun visors will be discussed. Those of skill in the art will appreciate that alternative labeling of the present disclosure may be provided, which is consistent with the scope and spirit of this disclosure. Skilled readers should not view the inclusion of any alternative labels as limiting in any way.

Disclosed herein are substantially transparent vehicle sun visor apparatuses comprising a panel component 101, 201, 301, 401, wherein the panel component 101, 201, 301, 401 further comprises a top edge 202, 302, 402 and a bottom edge 203, 303, 403; and apertures 404 at the top edge 202, 302, 402. Apparatuses as described herein may further comprise a rod assembly 102, 204, 304 wherein the rod assembly 102, 204, 304 may further comprise a rod 1101, a rod holder 1102, 1201, and a bracket 205, 305, 1103, 1301. The rod 1101 may comprise at least one curved end. The rod holder 1102, 1201 may be configured to slide onto the rod 1101. The rod holder 1102, 1201 may be configured to slide through the apertures 404. The bracket 205, 305, 1103, 1301 may be configured to attach to the rod 1101. The panel component 101, 201, 301, 401 may further comprise at least one track 206, 306, 405 and a stopper 103, 207, 307, 1001. The stopper 103, 207, 307, 1001 may be configured to attach to the panel component 101, 201, 301, 401 at the end of the at least one track 206, 306, 405. The apparatuses described herein may further comprise a mirror assembly 104, 208, wherein the mirror assembly 104, 208 may comprise a mirror 601, 901, a mirror holder 602, 701, a mirror cover 603, 801, and an accessory slider 501. The mirror assembly 104, 208 may be configured to slide onto the track 206, 306, 405. The panel component 101, 201, 301, 401 of apparatuses as described herein may comprise at least one material selected from the group of materials consisting of the following: polypropylene, Columbia resin #39, thermoplastic rubber, glass, polycarbonate, high-index material, poly (methyl methacrylate), and Trivex. The material used to make the panel component 101, 201, 301, 401 may be substantially transparent, may be tinted, and may block substantially all ultraviolet rays.

Substantially transparent vehicle sun visor apparatuses as described herein may have a width of the top edge 202, 302, 402 of the panel component 101, 201, 301, 401 between approximately 5 mm and 40 mm. The width of the track 206, 306, 405 may be between approximately 5 mm and 40 mm. Accordingly, in some but not all embodiments, the width at the top edge 202, 302, 402 of the panel component 101, 201, 301, 401 and the width of the track 206, 306, 405 may be greater than the width of the remaining portions of the panel component 101, 201, 301, 401.

In some embodiments, the width of the top edge of the panel component and the width of the track may be broader than the remaining width of the panel component. This configuration may lead to cost savings because less material may be needed to make the apparatus. According to these embodiments, portions of the panel component where other components are attached are made broader to accommodate the increase in width of the top edge and the track.

The mirror assembly 104, 208 may comprise a mirror holder 602, 701 and a mirror cover 603, 801. The mirror 601, 901 may be configured to attach to the mirror holder 602, 701, The mirror holder 602, 701 may be configured to attach to the accessory slider 501. The mirror cover 603, 801 may comprise a spring notch assembly 802 and a mirror cover notch 803. The spring notch assembly 802 and the mirror cover notch 803 may be configured to attach to the mirror holder 602, 701. The accessory slider 501 may be configured to slide onto the track 206, 306, 405.

The mirror holder 602, 701 may comprise one or more protrusions 702. The accessory slider 501 may comprise one or more depressions 502. The one or more protrusions 702 and the one or more depressions 502 may be configured to connect to one another.

The mirror holder 602, 701 may be configured to attach to the accessory slider 501 though magnets, snap fit, adhesive, clips, latches, screws, hook-and-loop, or welding.

The mirror assembly 104, 208 may have a width between approximately 5 cm and 50 cm, as measured from the mirror assembly left edge 604 to the mirror assembly right edge 605. The height of the mirror assembly may be between approximately 5 cm and approximately 25 cm, as measured from the mirror assembly top edge 606 to the bottom edge 607.

The track 206, 306, 405 may comprise wall shapes selected from the group consisting of the following: sloping walls, rounded walls, grooved walls, perpendicularly straight walls, sloping walls, geared walls, and toothed walls.

The panel component 101, 201, 301, 401 may comprise a coating selected from the group coating consisting of the following: anti-reflective coating, scratch-resistant coating, UV protective coating, tinted coating, polarized coating, mirror coating, and blue-light blocking coating FIG. 1A shows one, non-limiting, embodiment of a substantially transparent vehicle sun visor apparatus mounted in a vehicle. Apparatuses of the present disclosure may comprise a panel component 101, 201, 301, 401 mountable onto a rod assembly 102, 204, 304. Apparatuses of the present disclosure may comprise a mirror assembly 104, 208 comprising an accessory slider 501 that is configured to attach to the mirror assembly 104, 208. A stopper 103, 207, 307, 1001 is configured to attach to the end of the track 206, 306, 405. The embodiment shown in FIG. 1A also shows the rod assembly 102, 204, 304 clipped into a vehicle visor bracket hook.

Figure 1B:
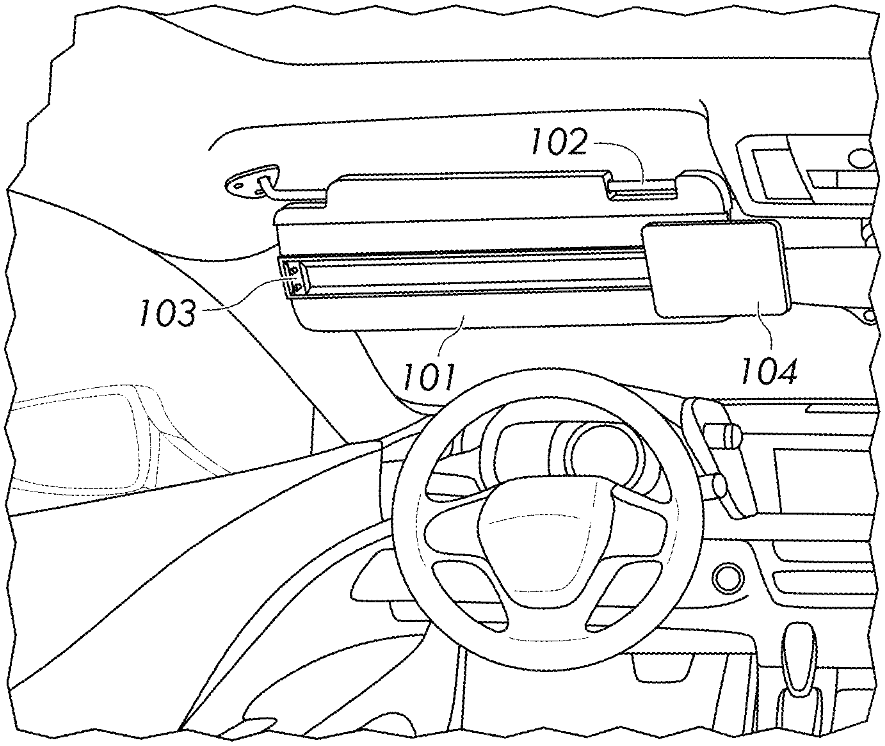
FIG. 1B is a perspective view of a substantially transparent sun visor component mounted in a vehicle, according to an embodiment of this disclosure.

As seen in FIG. 1B, the mirror assembly 104, 208 can slide onto the opening of the track 206, 306, 405. The opening of the track 206, 306, 405 is on the opposite side of the panel component 101, 201, 301, 401 that has the stopper 103, 207, 307, 1001.

Figure 2A:
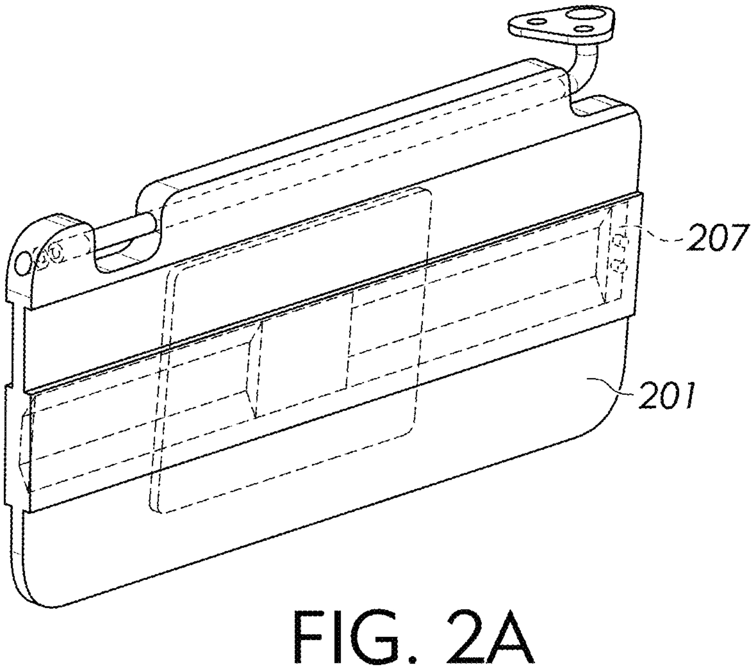
FIG. 2A is a rear perspective view of a substantially transparent sun visor component, according to an embodiment of this disclosure.

An embodiment of the present invention is seen in FIG. 2A, where the mirror assembly 104, 208 is located in the middle of the track 206, 306, 405.

Figure 2B:
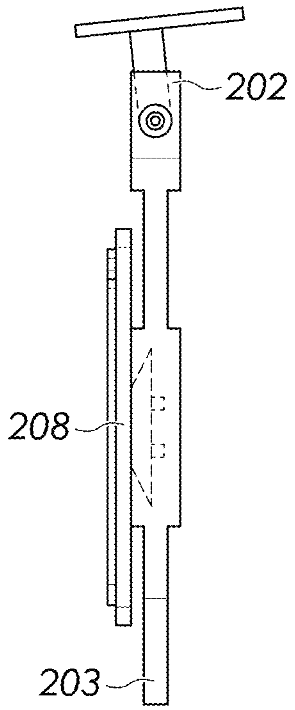
FIG. 2B is a left side view of a substantially transparent sun visor component, according to an embodiment of this disclosure.

FIG. 2B, depicts a side view of the present invention, where the top edge 202, 302, 402 and the bottom edge 203, 303, 403 of the panel component 101, 201, 301, 401 are seen.

Figure 2C:
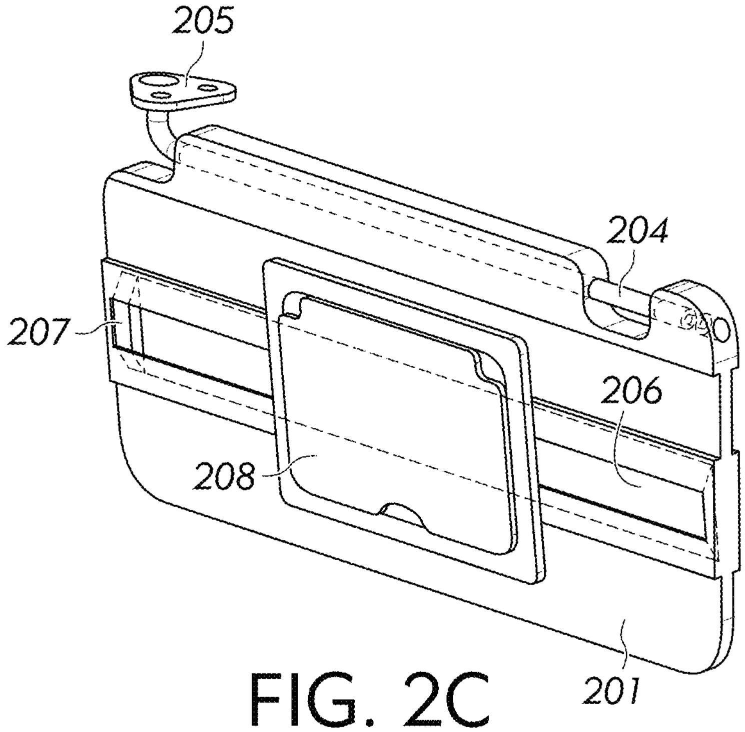
FIG. 2C is a front perspective view of a substantially transparent sun visor component, according to an embodiment of this disclosure.

The front view of the present invention is seen in FIG. 2C, where the mirror assembly 104, 208 is located in the middle of the track 206, 306, 405 and the mirror cover 603, 801 of the mirror assembly 104, 208 is closed.

Figure 3A:
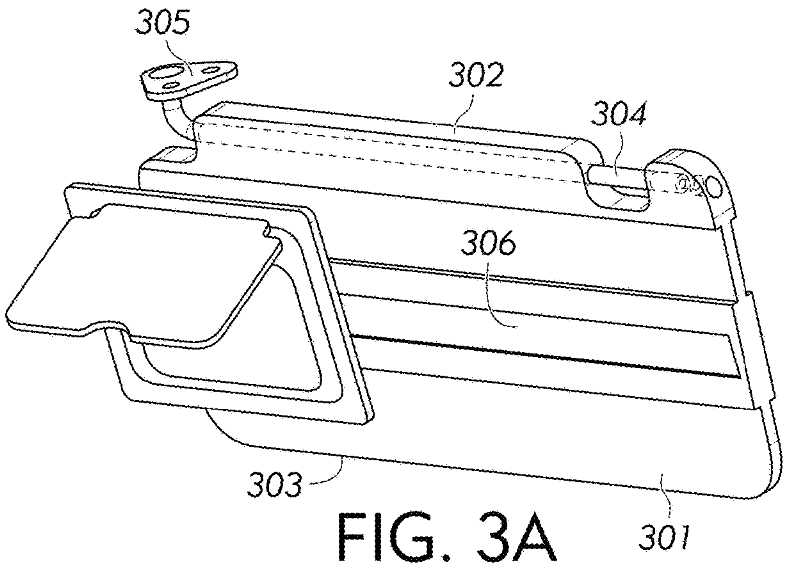
FIG. 3A is a front perspective view of a substantially transparent sun visor component, according to an embodiment of this disclosure.

FIG. 3A shows the mirror assembly 104, 208 located at the end of the track 206, 306, 405, where the stopper 103, 207, 307, 1001 is assembled.

Figure 3B:
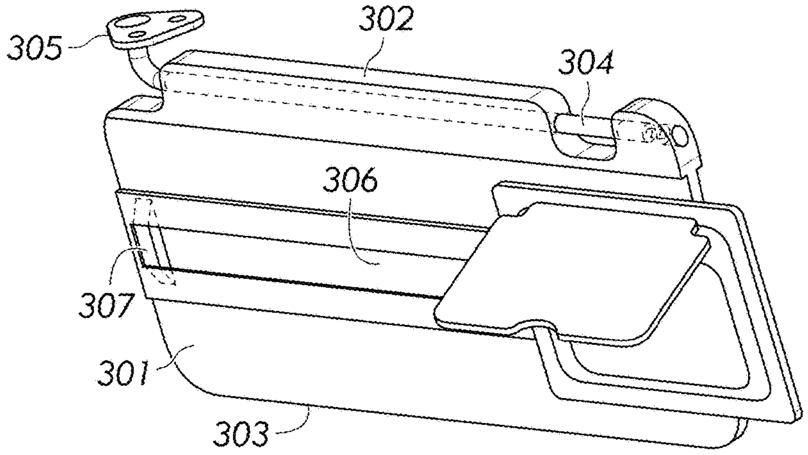
FIG. 3B is a front perspective view of a substantially transparent sun visor component, according to an embodiment of this disclosure.

FIG. 3B depicts the mirror assembly 104, 208 located at the opening of the track 206, 306, 405.

Figure 3C:
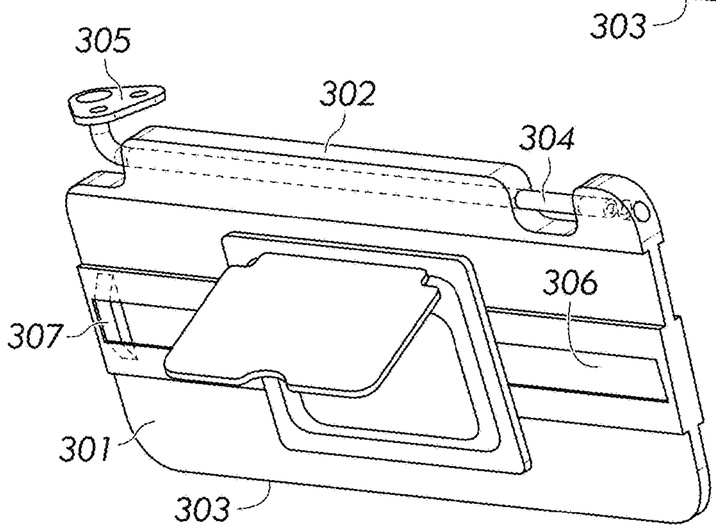
FIG. 3C is a front perspective view of a substantially transparent sun visor component, according to an embodiment of this disclosure.

FIG. 3C depicts the mirror assembly 104, 208 located in the middle of the track 206, 306, 405 and the mirror cover 603, 801 of the mirror assembly 104, 208 is opened.

Examples of solid materials suitable for constructing the panel component 101, 201, 301, 401 discussed herein include, without limitation, polypropylene, Columbia resin #39, thermoplastic rubber, glass, polycarbonate, high-index material, poly (methyl methacrylate), and Trivex. In a preferred embodiment of the panel component 101, 201, 301, 401, the panel component 101, 201, 301, 401 is made of a material that blocks substantially all ultraviolet rays. Such materials include, without limitation, polycarbonate and Trivex. The panel component 101, 201, 301, 401 may also comprise a coating. The coating may include, without limitation, anti-reflective coating, scratch resistant coating, UV protective coating, tinted coating, polarized coating, mirror coating and blue-light blocking coating.

Figure 4:
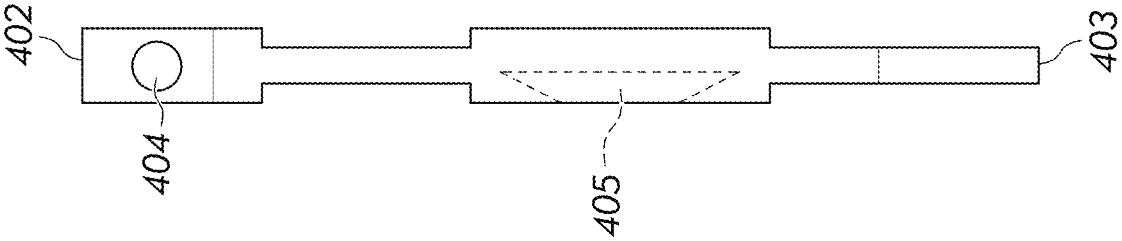
FIG. 4 is a perspective view of the panel component, according to an embodiment of this disclosure.
Figure 4:
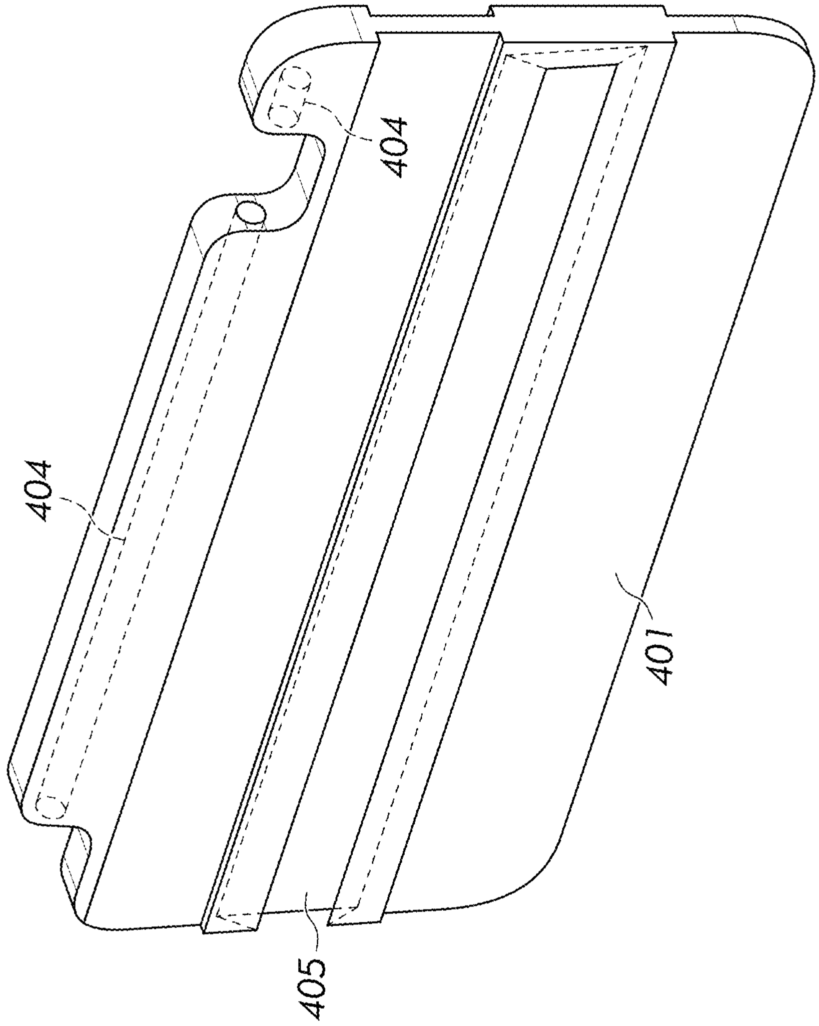

As shown in FIG. 4, the panel component 101, 201, 301, 401 comprises apertures 404, that are configured to receive the rod assembly 102, 204, 304. The rod assembly 102, 204, 304 may comprise a rod 1101, rod holder 1102, 1201, and bracket 205, 305, 1103, 1301. The rod holder 1102, 1201 may be configured to slide onto the rod 1101. The apertures 404 are configured to receive the rod holder 1102, 1201. As seen in FIG. 4, the track 206, 306, 405 may be positioned at or near the middle of the panel component 101, 201, 301, 401. However, the track 206, 306, 405 may be located in other areas of the panel component 101, 201, 301, 401. In the present disclosure, the track 206, 306, 405 may, without limitation, comprise a track 206, 306, 405 with downward sloping walls. However, the track 206, 306, 405 shape may also be, without limitation, rounded, grooved, perpendicularly straight, sloping, geared, or toothed.

Figure 5A:
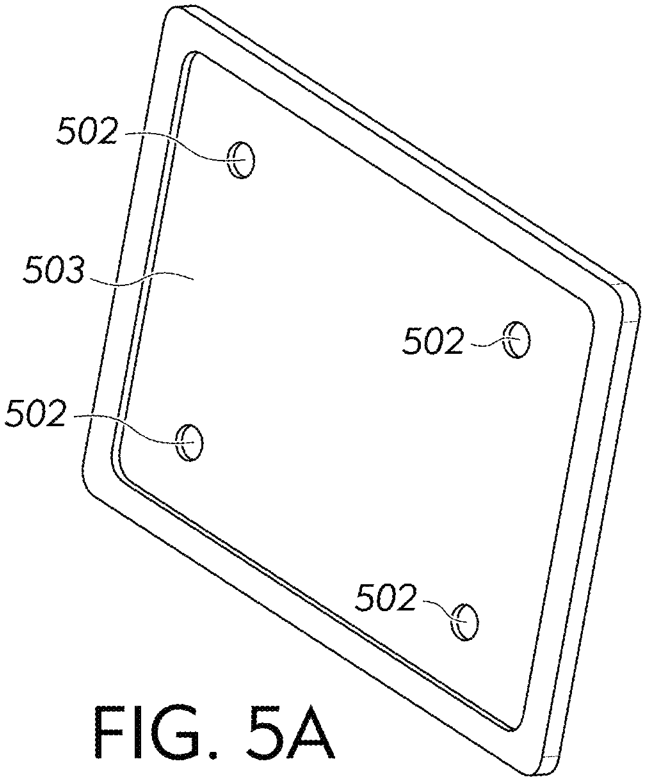
FIG. 5A is a front perspective view of the accessory slider, according to an embodiment of this disclosure.

As shown in FIG. 5A, the accessory slider 501 may comprise a slider indent 503 and slider depressions 502.

Figure 5B:
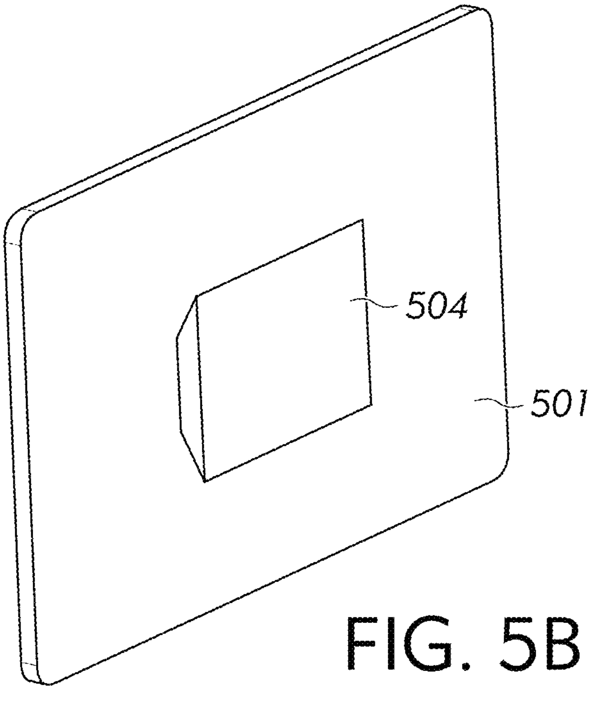
FIG. 5B is a rear perspective view of the accessory slider, according to an embodiment of this disclosure.

FIG. 5B shows the back side of the accessory slider 501, which may comprise a wedge-shaped protrusion 504.

In an alternative embodiment, the accessory slider 501 may be attached to the panel component 101, 201, 301, 401 for example, and without limitation by magnets, snap fit, wires, magnetic wires, suction cups, clips, latches, or strings.

The width of the top edge 202, 302, 402 of the panel component 101, 201, 301, 401 may be between approximately 5 mm and 40 mm. The width of the track 206, 306, 405 in the panel component 101, 201, 301, 401 may be between approximately 5 mm and 40 mm.

Figure 6A:
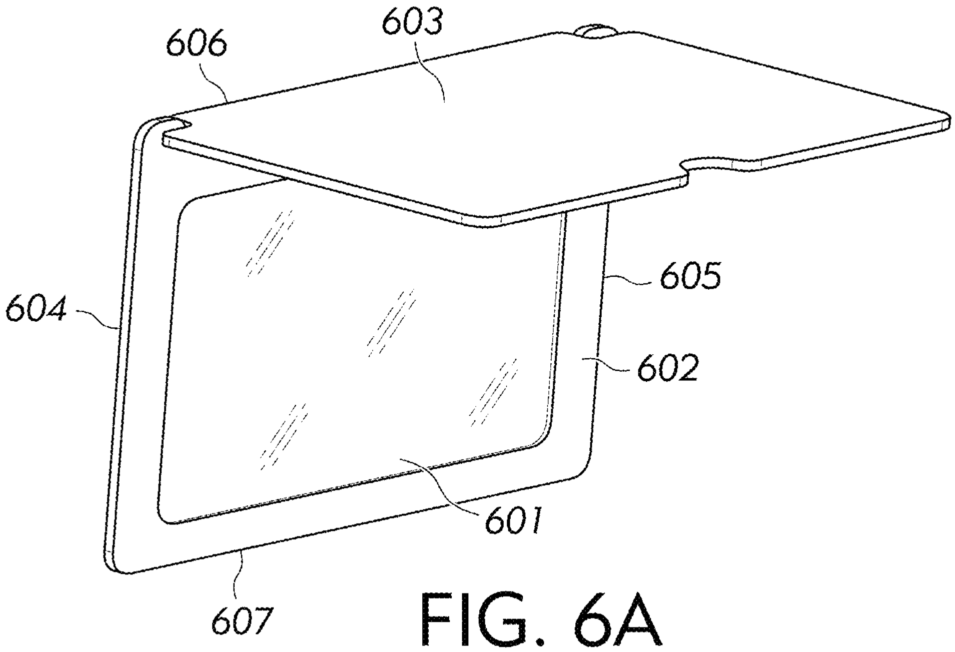
FIG. 6A is a front perspective view of the mirror assembly, according to an embodiment of this disclosure.
Figure 6B:
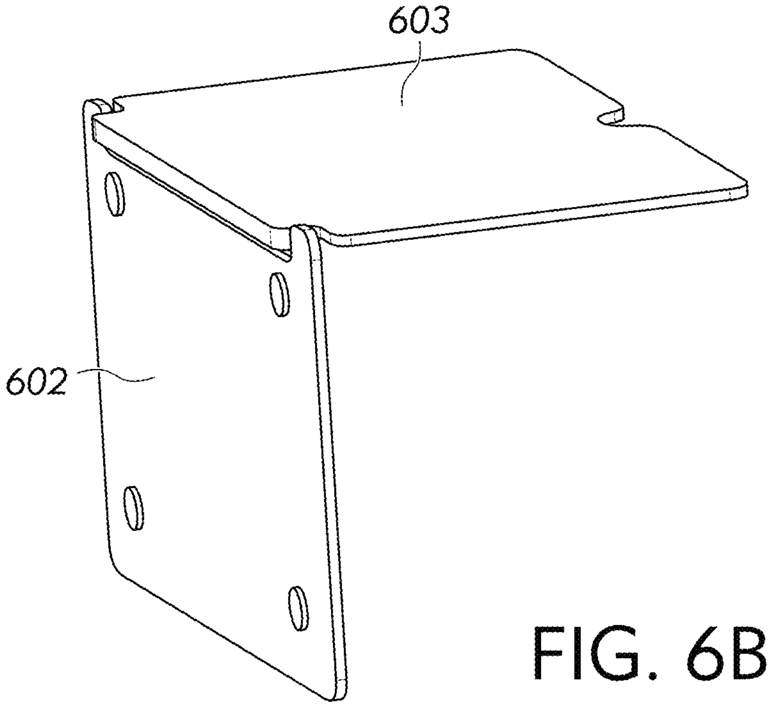
FIG. 6B is a left side view of the mirror assembly, according to an embodiment of this disclosure.

FIG. 6A and FIG. 6B depict the mirror 601, 901 located in the mirror holder 602, 701 with the mirror cover 603, 801 at an opened position.

Figure 7A:
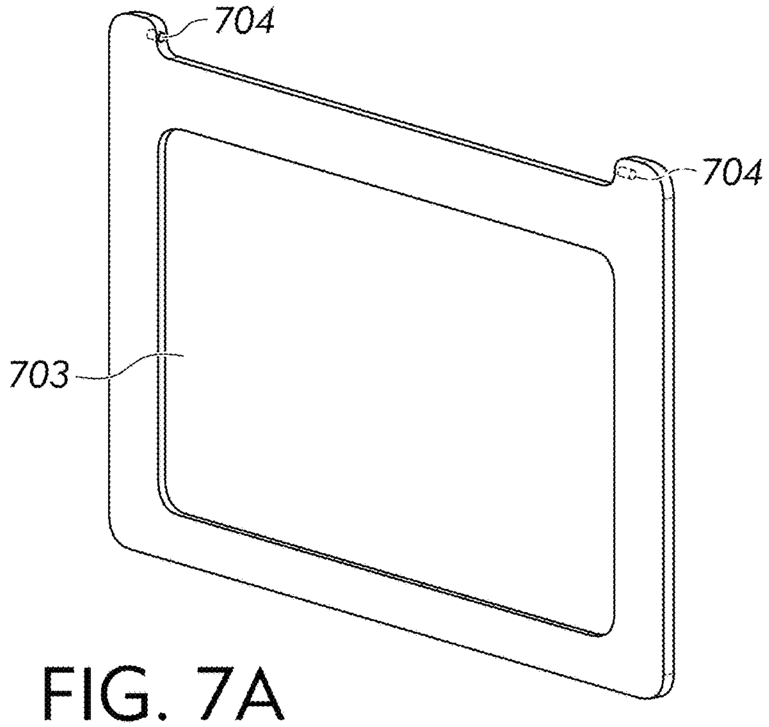
FIG. 7A is a front perspective view of the mirror holder, according to an embodiment of this disclosure.

FIG. 7A shows a front view of the mirror holder 602, 701 component isolated.

Figure 7B:
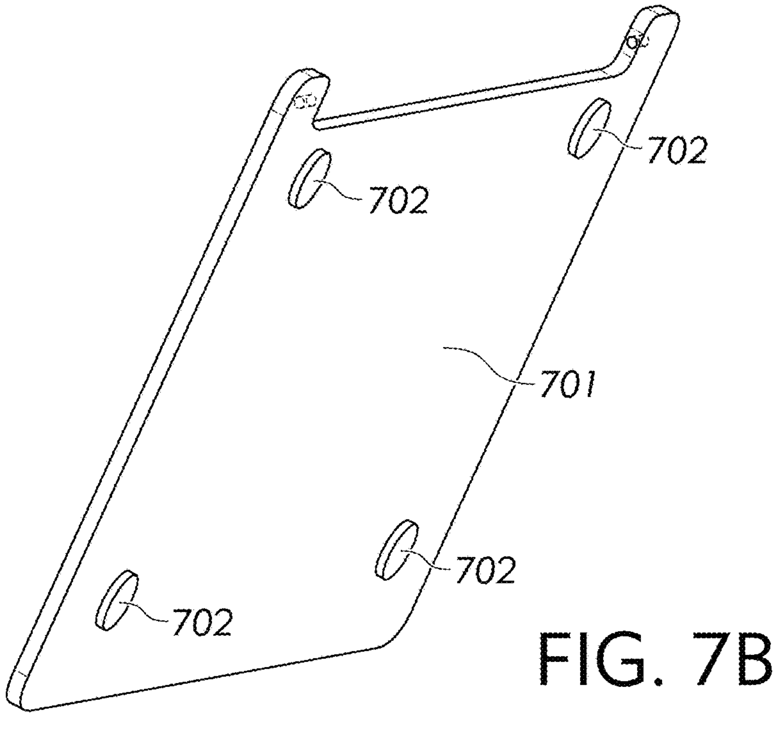
FIG. 7B is a rear perspective view of the mirror holder, according to an embodiment of this disclosure.

FIG. 7B shows the back side of the mirror holder 602, 701, which may comprise one or more protrusions 702 which may be used to connect the mirror holder 602, 701 to the accessory slider 501.

Figure 8:
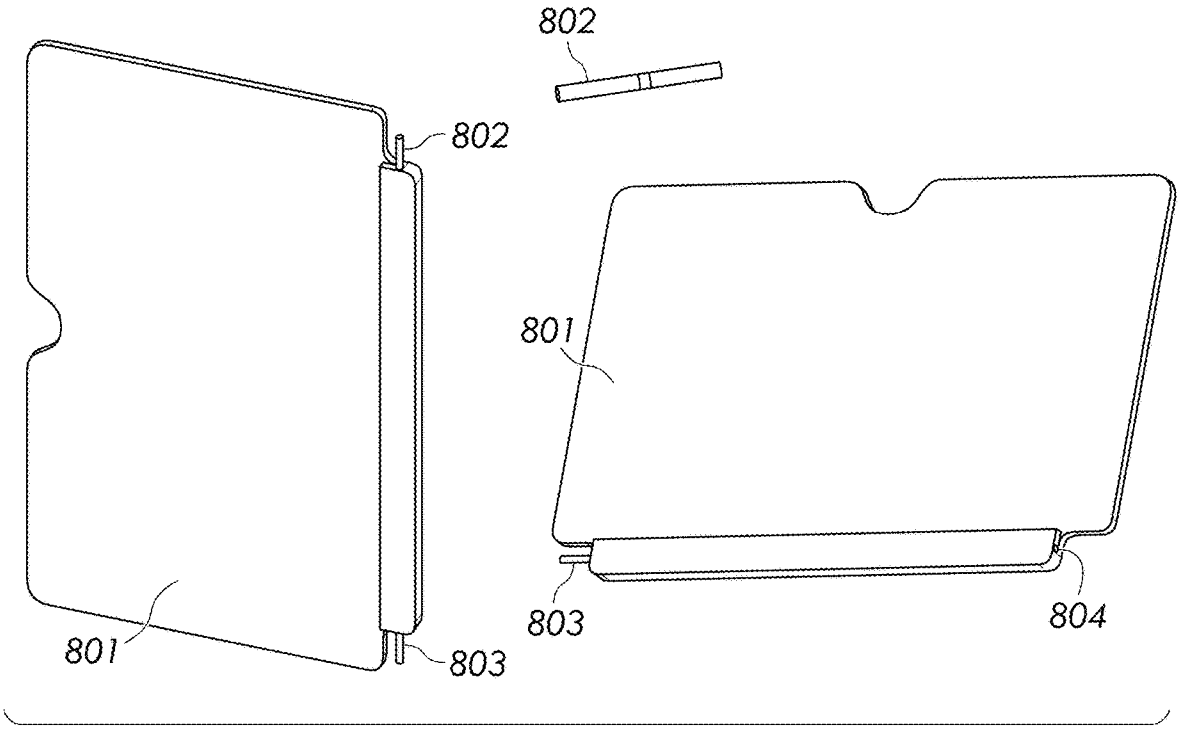
FIG. 8 is an exploded view of the mirror cover and spring-notch assembly, according to an embodiment of this disclosure.

FIG. 8 shows the mirror cover 603, 801 and the spring notch assembly 802 which can be used to install the mirror cover 603, 801 to the mirror holder 602, 701 in some specific embodiments of the present invention.

Figure 9:
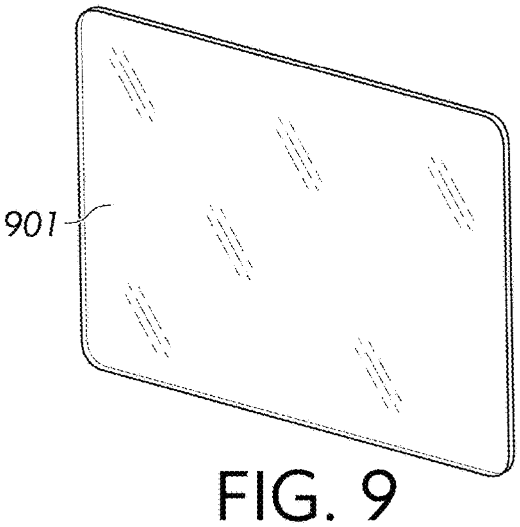
FIG. 9 is a perspective view of the mirror, according to an embodiment of this disclosure.

FIG. 9 shows an isolated mirror 601, 901 component.

Figure 10:
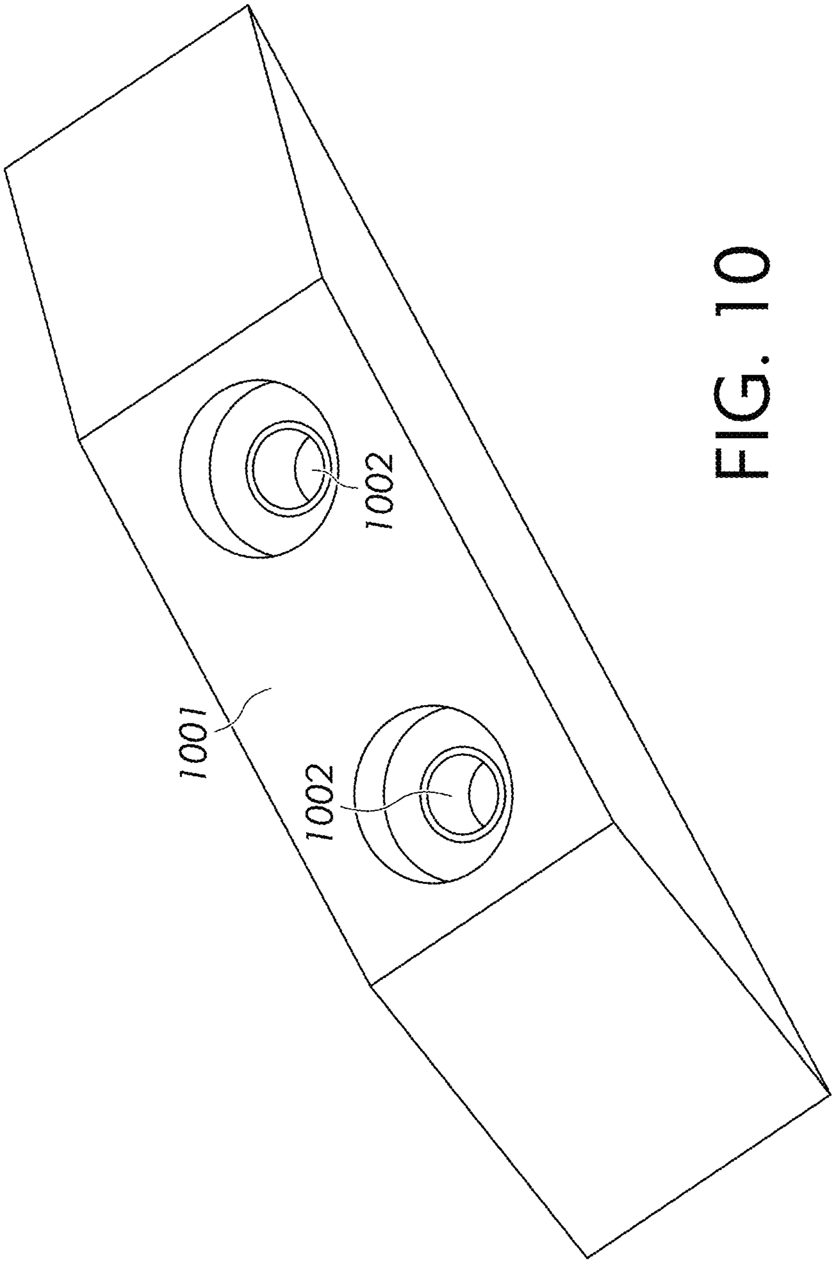
FIG. 10 is a top perspective view of the stopper, according to an embodiment of this disclosure.

FIG. 10 shows the stopper 103, 207, 307, 1001, which comprises of stopper installation holes 1002 which are used to install the stopper 103, 207, 307, 1001 to the panel component 101, 201, 301, 401. The mirror 601, 901 may be installed into an indent 703 in the mirror holder 602, 701. The mirror cover 603, 801 may be installed to the mirror holder 602, 701 by the mirror cover notch 803 and the spring notch assembly 802. The spring notch assembly 802 may be configured to be inserted into the spring notch hole 804. The mirror cover notch 803 and the spring notch assembly 802 may be configured to be inserted into the mirror holder slots 704. The mirror holder 602, 701 may be configured to attach to the accessory slider 501 via protrusions 702 which may be configured to connect with slider depressions 502 in a stable, locked configuration. The mirror assembly 104, 208 may be configured to embed into slider indent 503. The wedge-shaped protrusion 504 may comprise a male member whereas the track 206, 306, 405 may comprise a female member. The wedge-shaped protrusion 504 may be configured to slide onto the track 206, 306, 405. The wedge-shaped protrusion 504 may be located on the back side of the accessory slider 501. The accessory slider 501 may be prevented from sliding off of the track 206, 306, 405 by the stopper 103, 207, 307, 1001.

The mirror 601, 901 may be attached to the accessory slider 501 by, for example, and without limitation, magnets, snap fit, adhesive, clips, latches, screws, hook-and-loop, or welding.

Figure 11A:
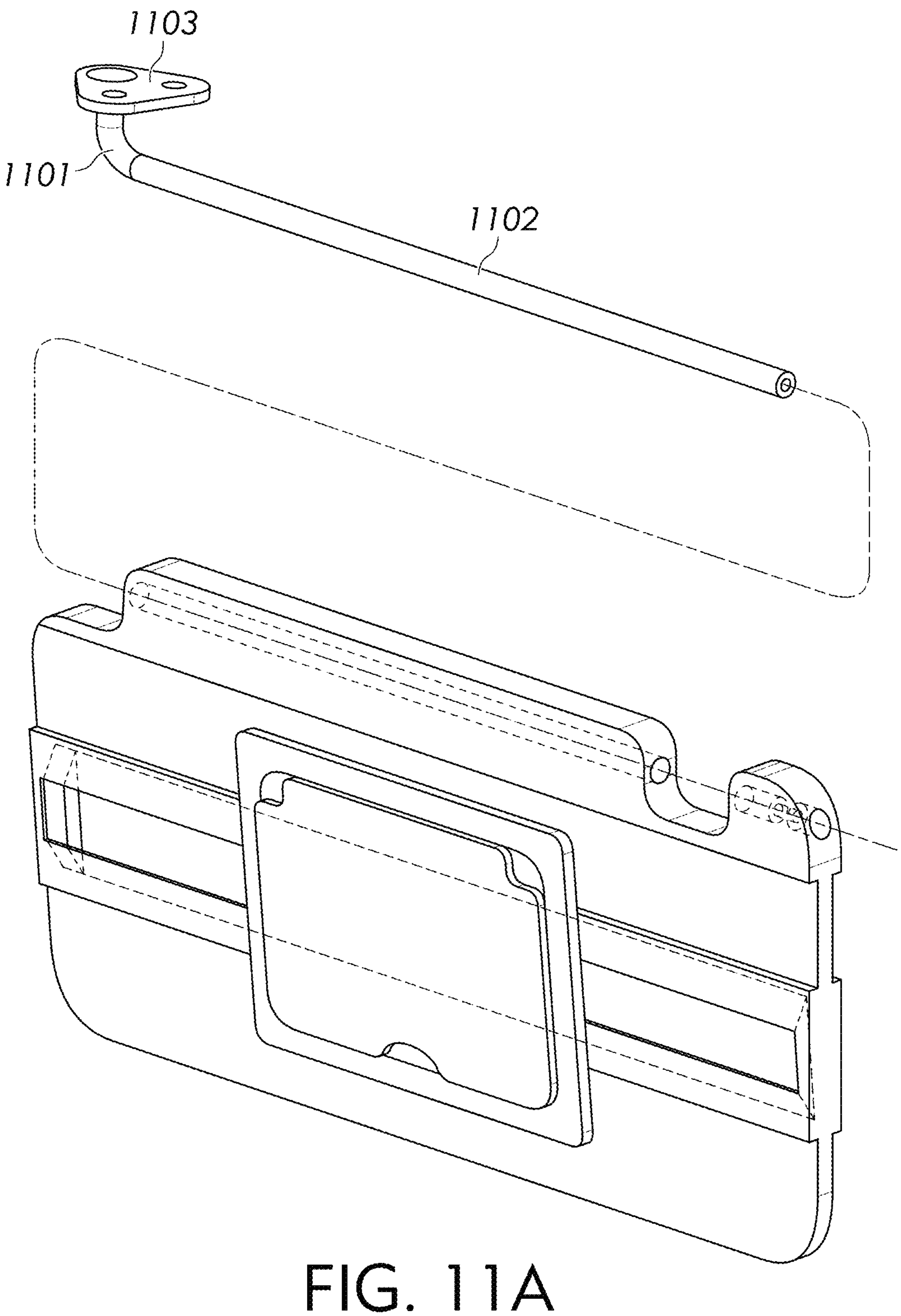
FIG. 11A is an enlarged view of the rod assembly as engaged with the panel component, according to an embodiment of this disclosure.

FIG. 11A shows the rod assembly 102, 204, 304 which may include the bracket 205, 305, 1103, 1301, the rod 1101 and the rod holder 1102, 1201.

Figure 11B:
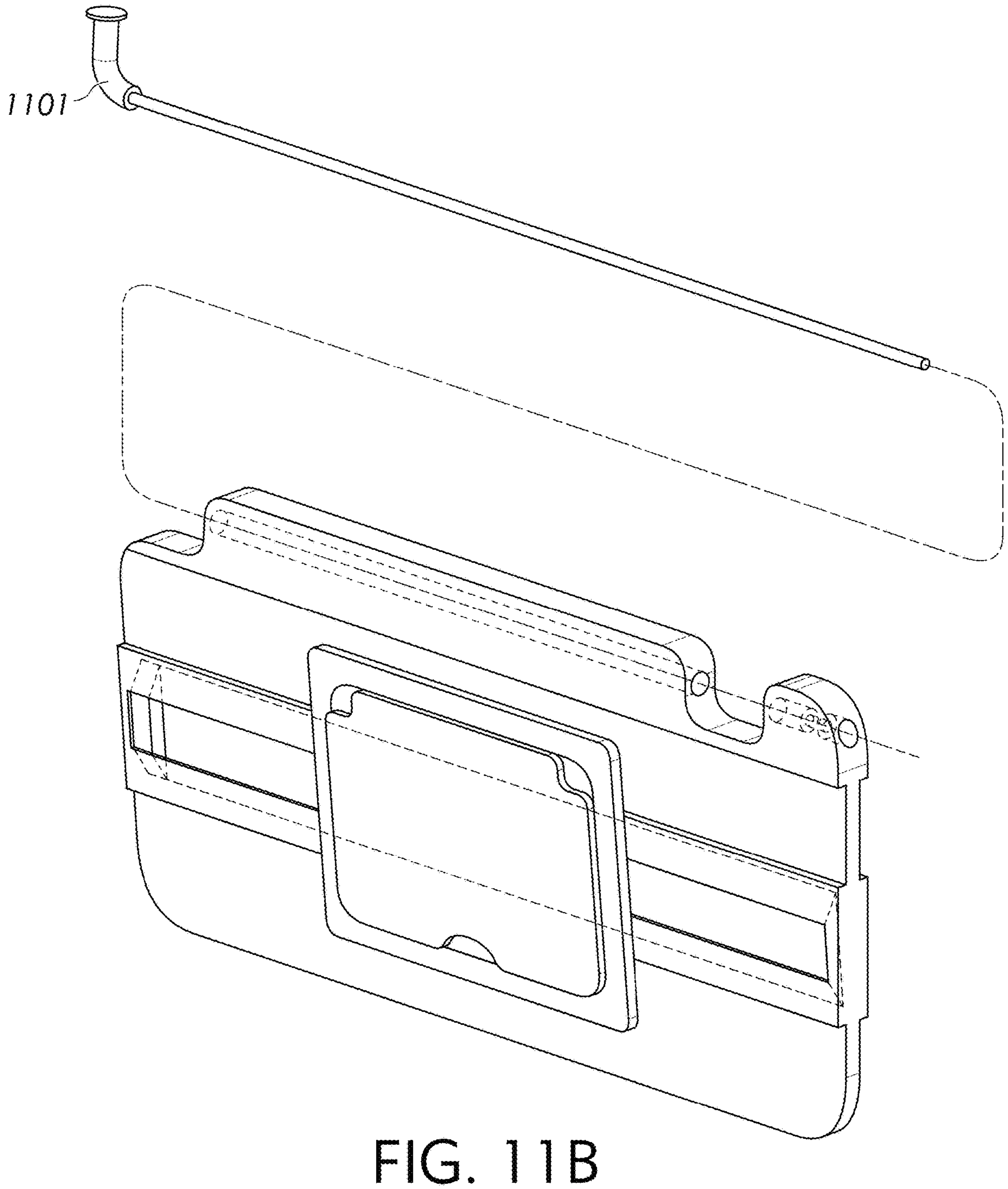
FIG. 11B is an enlarged view of the rod as engaged with the panel component, according to an embodiment of this disclosure.

FIG. 11B shows an isolated view of the rod 1101 and an enlarged view of the rod 1101 connected to panel component 101, 201, 301, 401.

Figure 12:
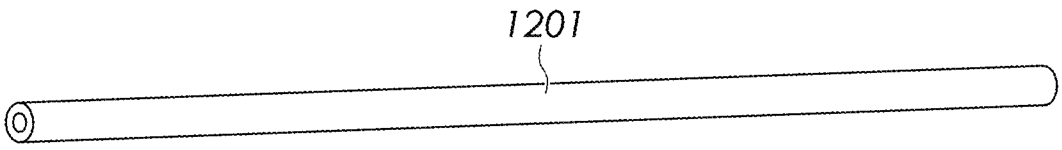
FIG. 12 is a side view of the rod holder, according to an embodiment of this disclosure.

FIG. 12 is an isolated view of the rod holder 1102, 1201.

Figure 13:
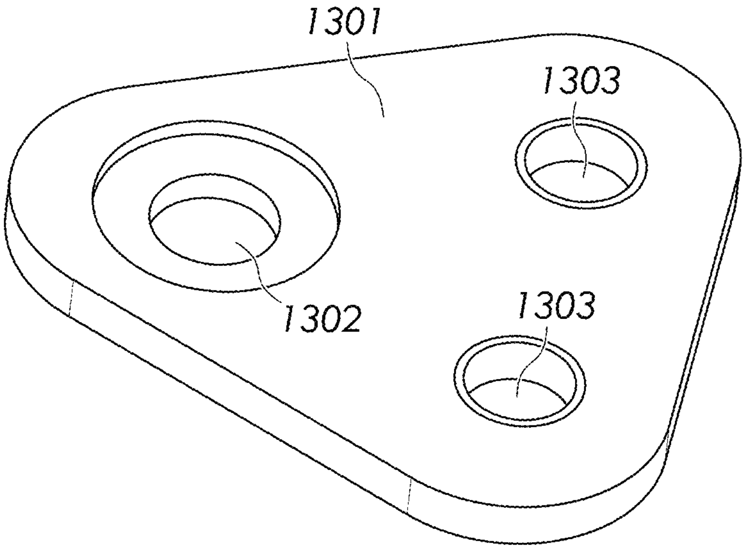
FIG. 13 is a top perspective view of the bracket, according to an embodiment of this disclosure.

FIG. 13 depicts the bracket 205, 305, 1103, 1301 which has a bracket rod hole 1302 and bracket installation holes 1303.

The panel component 101, 201, 301, 401 may be mounted to a vehicle by engaging the panel component 101, 201, 301, 401 with the rod assembly 102, 204, 304. The bracket 205, 305, 1103, 1301 may be connected to the rod 1101 via the bracket rod hole 1302. The bracket 205, 305, 1103, 1301 may be installed to an interior of a vehicle by any manner of fastening, which methods would be readily appreciated by those skilled in the art and are not intended to be limited by this disclosure in any way. In an embodiment, such fastening may be achieved using screws, which may be screwed through the bracket installation holes 1303. In an alternative embodiment, the panel component 101, 201, 301, 401 may be installed onto a pre-existing visor rod already included within the vehicle.

The rod holder 1102, 1201, may be configured to have an outer diameter between approximately 3 mm and 50 mm. The rod holder 1102, 1201, may be one single member or may be comprised of multiple members that are configured to attach or slide into the apertures 404.

While aspects of the substantially transparent sun visor apparatuses to which this disclosure is directed have been described above, the above description is intended to illustrate and not limit the number of potential embodiments contemplated herein. Skilled artisans will appreciate additional aspects of the invention, which may be realized in alternative embodiments, after having the benefit of the above disclosure.

The invention claimed is:

1. A transparent vehicle sun visor apparatus comprising:
a panel component, wherein the panel component comprises:
a top edge and a bottom edge; and
apertures at the top edge;
a rod assembly, wherein the rod assembly further comprises
a rod;
a rod holder; and
a bracket;
wherein the rod comprises at least one curved end;
wherein the rod holder is configured to slide onto the rod;
wherein the rod holder is configured to slide through the apertures;
wherein the bracket is configured to attach to the rod;
wherein the panel component further comprises at least one track and a stopper;
where the stopper is configured to attach to the panel component at the end of the at least one track;
a mirror assembly, wherein the mirror assembly comprises
a mirror; and
an accessory slider:
wherein the mirror is configured to attach to the accessory slider;
wherein the accessory slider is configured to slide onto the track;
wherein the mirror assembly further comprises a mirror holder and a mirror cover, wherein the mirror is configured to attach to the mirror holder; and
wherein the mirror holder is configured to attach to the accessory slider;
wherein the mirror cover further comprises a spring notch assembly and a mirror cover notch, wherein the spring notch assembly and the mirror cover notch are configured to attach to the mirror holder.

2. The transparent vehicle sun visor apparatus of claim 1, wherein:
the mirror holder comprises one or more protrusions;
the accessory slider comprises one or more depressions; and
the one or more protrusions and the one or more depressions are configured to connect to one another.

3. The substantially transparent vehicle sun visor apparatus of claim 1, wherein the mirror holder is configured to attach to the accessory slider through magnets, snap fit, adhesive, clips, latches, screws, hook-and-loop, or welding.

4. The transparent vehicle sun visor apparatus of claim 1, wherein the panel component comprises a material that blocks ultraviolet rays.

5. The transparent vehicle sun visor apparatus of claim 1, wherein the panel component comprises a coating selected from the group coating consisting of the following: anti-reflective coating, scratch resistant coating, UV protective coating, tinted coating, polarized coating, mirror coating, and blue-light blocking coating.

6. A transparent vehicle sun visor apparatus comprising:
a panel component:

the panel component further comprising a top edge, a bottom edge and at least one track:

a stopper, wherein the stopper is configured to attach to the panel component at the end of the track; and a mirror assembly, wherein the mirror assembly comprises a mirror, a mirror holder, a mirror cover, and an accessory slider comprising a wedge-shaped protrusion, wherein the wedge-shaped protrusion is configured to slide onto the track;

wherein the mirror is configured to attach to the mirror holder;

wherein the mirror holder is configured to attach to the accessory slider;

wherein the mirror cover further comprises a spring notch assembly and a mirror cover notch; and wherein the spring notch assembly and the mirror cover notch are configured to attach to the mirror holder.

7. A transparent vehicle sun visor apparatus comprising:

a panel component, wherein the panel component further comprises:

a top edge and a bottom edge; and apertures at the top edge;

a rod assembly, wherein the rod assembly comprises a rod holder, a rod and a bracket;

wherein the rod is configured to have at least one curved end;

wherein the rod holder is configured to slide onto the rod;

wherein the rod holder is configured to slide through the apertures of the panel component;

wherein the bracket is configured to attach to the rod;

a mirror assembly;

wherein the mirror assembly comprises a mirror, a mirror holder, a mirror cover, and an accessory slider;

wherein the mirror is configured to attach to the mirror holder;

wherein the mirror holder is configured to attach to the accessory slider;

and wherein the mirror cover further comprises a spring notch assembly and a mirror cover notch, wherein the spring notch assembly and the mirror cover notch are configured to attach to the mirror holder.

8. The transparent vehicle sun visor apparatus of claim 7, wherein the mirror assembly is further configured to attach to the panel component by magnets, snap fit, wires, magnetic wires, suction cups, clips, latches, or strings.

* * * * *